Patented June 22, 1948

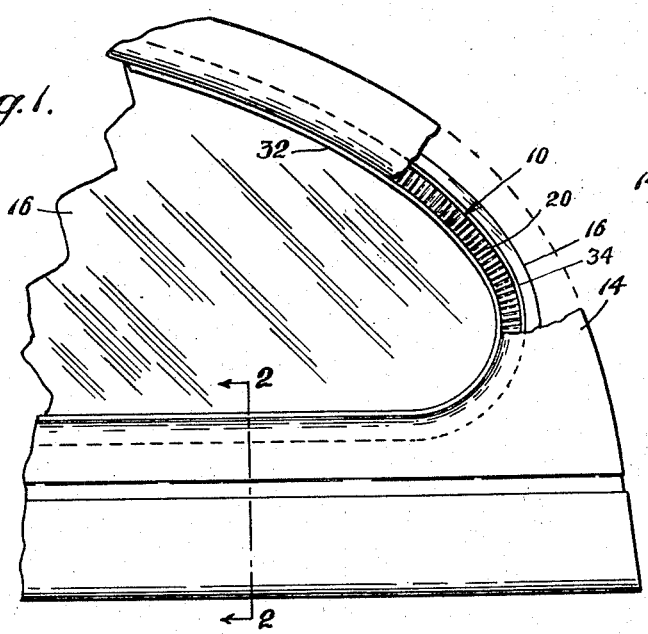
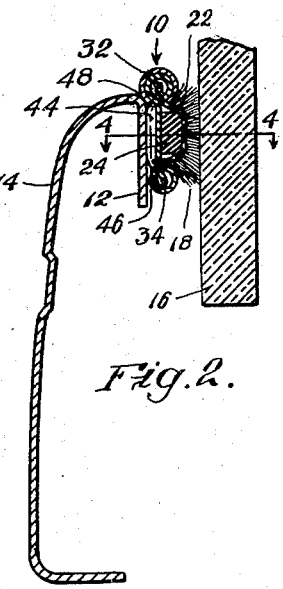
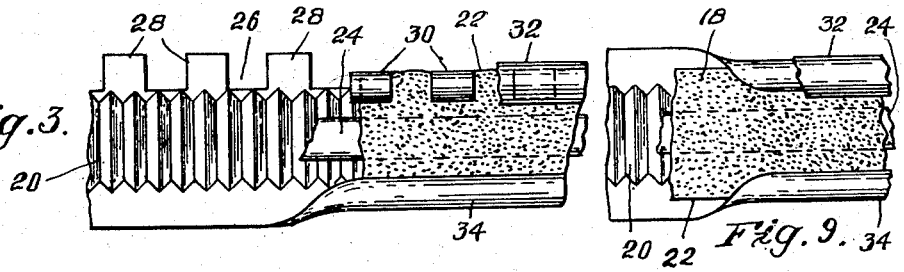
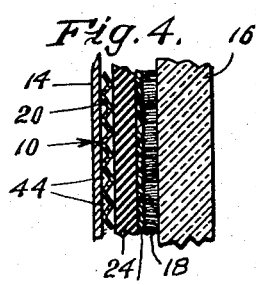
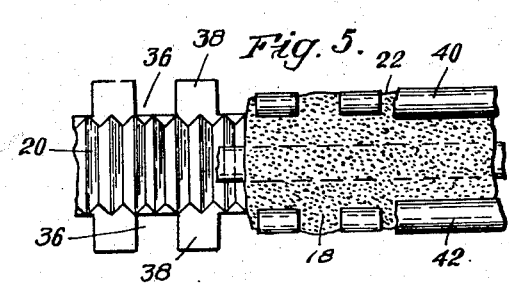
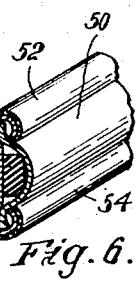
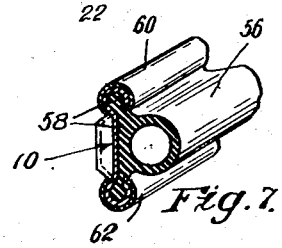
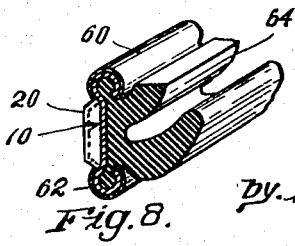

2,443,959

UNITED STATES PATENT OFFICE 2,443,959

WEATHER AND TRIM STRIP

Oliver B. Merrill, Amesbury, Mass., assignor to The Bailey Company, Inc., Amesbury, Mass., a corporation of Massachusetts Application March 14, 1945, Serial No. 582,758

10 Claims. (Cl. 20—69)

1

This invention relates to improvements in flexible weather and trim strips and the like. More particularly it relates to such strips of a general type suitable for use in vehicles and the like for weather stripping windows and as trim strips for ornamenting surfaces and for producing various decorative effects.

Weather and trim strip structures have been proposed heretofore for serving the general purposes which are served by the improved strips of my present invention but, because all of the prior strips of which I am aware have had generally flat rear sides which engage flatwise against their mounting surfaces, water and moisture entering between the strips and the mounting surfaces becomes entrapped and causes deterioration of one or both of the mutually engaged surfaces. This has been true especially where the strip has been a weather strip mounted on the metal frame around a vehicle window, for example, in that water entrapped between the strip and the metal frame causes corrosion of the metal frame notwithstanding that fabric backings, treated with moisture-proofing agents, have been applied to the metal strips and protect the engaged strip surfaces against the effects of moisture.

Also, the prior strips have employed an openwork metal body structure to facilitate bending and forming of the strips to desired contours. Ordinarily the openings thus made in the rear face of the strip are covered by the mentioned moisture-proofed fabric. However, the securing means for the strips have to pass through the strip and into the mounting frame or other surface, and frequently they pass through an opening in the metal to provide an ineffective and insecure attachment. Furthermore, any cutting of the strips often provides relatively weak projecting tongues of metal at the cut end of the strip, especially when the cut is oblique, as frequently is required.

It is among the objects of my present invention to provide weather and trim strips having provision for forming, with the mounting surface, a multiplicity of air ducts between a mounted strip and the surface on which it is mounted, whereby circulating air quickly removes moisture which may enter between the strip and the mounting surface.

Another object is to provide a weather and trim strip having a solid metal rear face which may rest against a mounting surface without need for a fabric backing and which is proof against corrosion at the engaged surfaces due to the mentioned ventilating air ducts.

2

Still another object is to provide an improved weather and trim strip which has the said solid metal rear face and which, nevertheless, may be bent and conformed readily and effectively to desired contours.

A further object is to provide a weather and trim strip having the aforementioned attributes and having provision for securely retaining on its front face any of a variety of elements which may be resilient strip elements for sealing engagement with a window or a door, or may be decorative bead strips for ornamentation of exposed surfaces.

The mentioned objects and results are attained with a metal strip which is corrugated transversely of the strip and the crests of corrugations of which are adapted to engage a mounting surface so that an air duct is provided between adjacent engaged crests. Preferably, the corrugations have extent less than the width of the strip so that marginal edge portions of the strip may be turned or rolled into clamping engagement with a strip element to be mounted on the front face of the corrugated metal strip. In order to increase the bending qualities of the strip, one of the marginal edge portions of the metal strip is notched outward of the corrugations to provide spaced tongues or tabs which are turned into the said clamping engagement with the element on the front face, and these tongues preferably are covered by a metal bead strip which preferably will be of stainless steel. With this notched construction, the notched edge preferably will be on the inside of any bend in the strip, the notches facilitating the bending, and the stainless steel bead strip being mounted for relative slip on the tongues, whereby the tongues can move toward each other within the bead during a bending of the strip. However, the full lateral extent of the corrugated metal strip between the edge beads is free from perforations, and any cutting of the strip provides a continuous cut edge between the beads. Also securing devices may be passed through the strip at any point along its extent with assurance that it will pierce metal and not a mere opening through the metal.

It is intended that the patent shall cover, by suitable expression in the appended claims, whatever features of patentable novelty exist in the invention disclosed.

In the accompanying drawing:

Figure 1 is an elevational view of a fragment of a vehicle window and frame having a weather strip embodying features of my invention embodied therein;

Figure 2 is a cross-sectional view on line 2—2 of Figure 1 on a larger scale;

Figure 3 is an elevation of a fragment of one of my improved weather strips showing the strip at different stages of its manufacture;

Figure 4 is a cross-sectional view on line 4—4 of Figure 2;

Figure 5 is a view similar to Figure 3 but showing a modified form of my improved weather strip;

Figure 6 is a perspective view of a fragment of a trim strip embodying features of my invention;

Figures 7 and 8 are perspective views of still other modified forms of my improved strips, each suitable for use as a windlace around a vehicle door, or the like; and Figure 9 is a perspective of a fragment of another form of weatherstrip.

Referring to the drawings, and more particularly to Figs. 1-4, one form of my improved weather strip is indicated generally at 10, mounted on the part 12 of a metal window frame 14. The part 12 extends all around the window and has its outer surface disposed generally in a vertical plane so that the weather strip 10 may be mounted thereon adjacent to the window glass 16 which ordinarily is movable up and down in suitable edge channels, not shown, and the weather strip has a pile fabric surface at 18 resiliently bearing against the glass all around the window when the latter is closed.

According to my invention, the weather strip 10 has a metallic body strip which is corrugated at 20, and whose edges are turned or rolled to clamp opposite side marginal portions of a strip of piled fabric 22. A mohair fabric is preferable although other comparable fabrics may be used, treated or not with a moisture-proofing agent, as may be desired.

The mohair fabric 22 is resiliently supported on the corrugated metallic body strip by engaging over a relatively thick and resilient shim strip 24 which contributes to the overall thickness and which conveniently may be of rubberized fabric although any suitable cushioning material may be employed. The strip 24 is held under compression between the corrugated part 20 of the metallic body strip and the mohair fabric 22, with the fabric, in transverse cross-section, bowed outward from the side marginal clamps, as best seen in Fig. 2.

Referring to Fig. 3, the metallic body strip is made from a flat strip of a suitable metal such as galvanized steel, for example. One side margin of the strip is notched as at 26 to provide spaced tongues 28 for being rolled as at 30 into clamping relation to the mohair fabric 22. A bead strip 32, which may be of stainless steel, is then rolled over the clamping tongues 28, preferably being slidable on the tongues so that the bead 32 can slip thereon when the strip as a whole is bent. The corrugations 20 may be formed in the same operation as the notches 26, or may be formed prior to or after the notching.

In the form of Figs. 2 and 3, the opposite side margin of the metallic body strip is left intact and is rolled into clamping relation to the mohair fabric 22 to constitute in itself a bead 34.

In Fig. 5, both side margins of the body strip are notched as at 36 to provide tongues 38 which are rolled into clamping relation to the mohair. The rolled tongues at one side may be covered with a stainless steel bead strip 40 and the tongues at the other side may be similarly covered by a bead strip 42 of galvanized steel, or both beads may be of the same material, if desired, although only one ordinarily will be visible.

The corrugations 20 of this strip preferably are formed subsequent to the notching, but may be formed during or prior to the notching.

In actual practice, I find it preferable to form the corrugations in the Fig. 5 form of strip by a mere bending of the metal with no appreciable drawing of the metal, while the strip of Fig. 3 conveniently is corrugated by drawing the metal of the strip. The strip of Fig. 5, corrugated by bending, is more flexible and thus better suited for negotiating sharp bends, as compared with the Fig. 3 form. On the other hand the Fig. 3 form requires substantially less metal in a given length of strip than is required in the Fig. 5 form.

It is a feature of the invention that the corrugated part 20 of the metallic body strip can rest against a metal supporting surface, such as the part 12 in Fig. 2, to provide a multiplicity of ducts 44 (Fig. 4) through which air may circulate to keep the surface of part 12 and the surfaces of the corrugated strip part substantially free from corrosive effects of water or moisture that may enter between the support and the strip 10. To this end, it is desirable that the corrugations 20 involve substantial displacements of the strip stock. Also the exterior crests of corrugations preferably are in a plane outward from the bead 34 which is interiorly and hidden. This provides free space 46 for passage of air between bead 34 and mounting part 12, to and from the ducts 44. The crack at 48 between the upper bead 32 and part 12 is sufficient to permit a needed amount of air circulation through the ducts.

While my improved strip construction has a particular utility for weather stripping vehicle windows and the like, its structural features are suitable also for use in trim strips and in mounting strips for windlaces and the like, by merely substituting for the mohair fabric of the weather strip a suitable element for serving the particular purpose for which the strip is to be used. For example, Fig. 6 shows a trim strip having the same corrugated body strip with beaded edges as disclosed in connection with the weather strip of Fig. 5. However, in place of the mohair fabric of the Fig. 5 structure, Fig. 6 has a strip 50 of decorative material such as a plain or suitably colored plastic clamped in the edge beads 52, 54, both of which latter may be of stainless steel. Such a strip may be mounted on a metal or other supporting surface for trim purposes.

Fig. 7 shows my corrugated and beaded strip mounting a tubular windlace 56 which has a base part 58 for being clamped in the beads 60, 62 as described in connection with the earlier figures.

Fig. 8 illustrates a modified form of windlace 64 mounted similar to the windlace of Fig. 7.

Obviously, the strips of Figs. 7 and 8 may have their metal corrugated strips formed according to the disclosures of either Fig. 3 or Fig. 5.

While I consider it preferable for most installations to notch at least one edge of the metal strip, it should be understood that the notches may be entirely omitted, as in Fig. 9, in which case the un-notched edges of the strip are rolled or turned into clamping relation to the mohair or other facing strip. One or both rolled edges may be covered by a bead strip as in the other forms. Such a strip will not have a degree of flexibility comparable with that of the notched strips but may be utilized where the strip is not required to negotiate sharp bends.

It will be recognized from the foregoing that my improved corrugated strip structure avoids the corrosive effects of moisture getting between the strip and its mounting surface, and provides a solid metal rear side of strip which facilitates effective and secure mounting thereof. Also my strip may be readily bent and formed to follow desired curved contours and, because of its solid metal mounting surface, it may be cut obliquely, as frequently as necessary, with no possibility of weak and jagged tongues of metal occurring at the cuts, which is an annoying and troublesome incident of prior strips made flexible by perforations or cut-outs in the metal body of a strip.

I claim as my invention:

1. A composite strip for embodiment in vehicles and the like, comprising a metallic strip beaded along at least one edge and having its body inward of the bead formed with grooves extending at least in part generally transversely of the strip, a second strip secured to the said metallic strip and covering said grooved part thereof at one side of the strip, said grooved part of the metallic strip at its uncovered side having the crests between grooves in a plane outward of said beaded edge and adapted to rest directly against a supporting surface with the bottoms of said grooves and said beaded edge spaced from the supporting surface, to provide air circulation spaces between said surface and the metallic strip.

2. A composite weather and trim strip, comprising a metallic strip beaded along at least one edge and having means stiffening its other edge, the region between said bead and stiffening means having transverse corrugations therein, a second strip facing the metallic strip at one side thereof and secured along its opposite edges by said bead and said stiffening means, the crests of said corrugations at the unfaced side of the metallic strip being in a plane outward from said stiffening means whereby said crests of corrugations may rest against a supporting surface and said stiffening means be held spaced therefrom to provide a passage for air to and from ducts between said crests of the corrugations.

3. A composite weather and trim strip structure, comprising a strip of metal having transverse corrugations therein terminating short of the opposite edges of the strip, a second strip covering the corrugations at one side of the metal strip, marginal plane portions of the metal strip along its opposite edges being turned into clamping engagement with edge margins of the covering strip, and crests of said corrugations at the uncovered side of the metallic strip being in a plane spaced outward from said turned marginal portion at one edge of the metal strip.

4. A composite weather and trim strip structure, comprising a strip of metal having transverse corrugations therein terminating a substantial distance short of the opposite edges of the strip thereby to leave the plane marginal portion along each edge, at least one of said plane marginal portions being notched to provide a series of spaced tongues along the notched edge, a second strip covering the corrugations at one side of the metal strip, said tongues of the metal strip being rolled into clamping relation with one marginal edge of said second strip, and the opposite plane marginal portion of the metal strip being rolled into clamping relation with the other marginal edge of said second strip, and a third strip rolled over the clamping tongues and consituting a continuous bead along the notched edge of the strip, said bead being formed to slip longitudinally relative to the clamping tongues to facilitate bending of the composite strip.

5. A composite weather and trim strip structure, comprising a strip of metal having transverse corrugations therein terminating a substantial distance short of the opposite edges of the strip thereby to leave a plane marginal portion along each edge, both of said plane marginal portions being notched to provide a series of spaced tongues along the edges of the strip and outward from said corrugations, a second strip covering the corrugations at one side of the metal strip, said tongues being rolled into clamping relation with the marginal edges of said second strip, and beading strips rolled over the clamping tongues at each edge of the composite strip, at least one of said beading strips being of ornamental sheet material, and combined for longitudinal slip thereof relative to the clamping tongues.

6. A composite weather and trim strip structure, comprising a metal strip beaded along each edge and imperforate between the said beads, a second strip clamped by said beads in covering relation to one side of the metal strip, means at said imperforate portion of the metal strip on its un-covered side projecting outward to a plane which is outward of at least one of said beads, for engaging a mounting surface and for providing air circulation spaces between the composite strip and a said mounting surface, and for providing air circulation space past at least one of said beads.

7. A composite weather and trim strip structure, comprising a metal strip beaded along each edge and imperforate between the said beads, a second strip clamped by said beads in covering relation to one side of the metal strip, a resilient cushioning strip intervening between said second strip and the metal strip maintaining said second strip under tension between its bead clamps, and corrugations in said imperforate part of the metal strip, between said beads, exposed crests of said corrugations being in a plane outward from at least one bead for resting against a supporting surface with said bead and bottoms of corrugation grooves spaced from said surface for circulation of air between said surface and the composite strip.

8. A composite weather strip comprising a strip of metal notched along one edge to provide a series of tongues, a strip of pile fabric superimposed on the metal strip with its pile side outward and clamped along one edge by said tongues, rolled into clamping engagement therewith, means at the opposite edge of the metal strip clamping the other edge of the fabric strip, a resilient strip intervening between the metal strip and the fabric strip maintaining the latter under tension between its edge clamps, and corrugations in the metal strip having exposed crests in a plane outward of at least one of said edge clamps for resting against a supporting surface with a said edge clamp and bottoms of corrugation grooves spaced from said surface to provide circulation spaces therebetween.

9. A composite weather strip comprising a strip of metal notched along one edge to provide a series of tongues, a strip of mohair fabric superimposed on the metal strip, with its pile surface outward, and clamped along one edge by said tongues which are rolled into clamping engagement therewith, the opposite edge of the metal strip being rolled into clamping engagement with the other edge of the mohair strip, a rubberized fabric strip intervening between the metal strip and the mohair strip and maintaining the latter under tension between its edge clamps, and corrugations in the metal strip having exposed crests in a plane outward of at least one of the rolled clamping edges of the metal strip for resting against a supporting surface to space a said rolled edge and bottoms of corrugation grooves outward from said surface thereby providing circulation spaces between said surface and the composite strip.

10. A weather strip comprising a metal strip corrugated transversely and beaded along each edge, the crests of corrugations at one face of the strip being in a plane spaced outward from said beads for resting against a supporting surface with said beads and bottoms of corrugation grooves spaced from said surface, and a windlace strip on the opposite face of the metal strip clamped at its opposite edges in the said beads.

OLIVER B. MERRILL.

REFERENCES CITED

The following references are of record in the file of this patent:

UNITED STATES PATENTS

| Number | Name | Date |
| --- | --- | --- |
| 1,919,130 | Reid | July 18, 1933 |
| 1,982,074 | Schlegel | Nov. 27, 1934 |
| 2,070,624 | Schlegel | Feb. 16, 1937 |
| 2,102,936 | Bailey | Dec. 21, 1937 |
| 2,182,687 | Bailey | Dec. 5, 1939 |
| 2,299,598 | Schlegel | Oct. 20, 1942 |